United States Patent
Stephan et al.

(10) Patent No.: US 6,299,109 B1
(45) Date of Patent: Oct. 9, 2001

(54) SPOILER FOR WINGS

(75) Inventors: Walter Anton Stephan, St. Martin; Hermann Filsegger, Ried im Innkreis, both of (AT)

(73) Assignee: Fischer Advanced Composite Components AG, Ried im Innkreis (AT)

(*) Notice: Subject to any disclaimer, the term of this patent is extended or adjusted under 35 U.S.C. 154(b) by 0 days.

(21) Appl. No.: 09/441,058

(22) Filed: Nov. 16, 1999

(30) Foreign Application Priority Data

Dec. 11, 1998 (AT) .................................................. 2079/98

(51) Int. Cl.[7] ........................................................ B64C 3/50
(52) U.S. Cl. ................................................................ 244/215
(58) Field of Search ............................... 244/215, 123, 244/198, 35, 45, 129.1

(56) References Cited

U.S. PATENT DOCUMENTS 4,712,752 * 12/1987 Victor ................................. 244/129.1
5,224,670 * 7/1993 Padden ................................. 244/123

FOREIGN PATENT DOCUMENTS 683982   6/1994 (CH) ..................................... 244/215

* cited by examiner

Primary Examiner—Charles T. Jordan
Assistant Examiner—George L. Steele
(74) Attorney, Agent, or Firm—Jacobson Holman, PLLC

(57) ABSTRACT

There is disclosed a spoiler for wings, in particular of planes, which spoiler is unfoldable during the landing and take-off of the plane or the like and retractable during cruising. In order to provide for enhanced aerodynamic conditions during landing and taking off without deteriorating the aerodynamic conditions during cruising, a structural member preferably made of a composite material and, in particular, carbon fiber reinforced plastic is arranged on the trailing edge of the spoiler, viewed in the direction opposite to the flight direction. The structural member, during landing or taking off, in the unfolded state of the spoiler with the landing flaps extended reduces the gap formed between the trailing edge of the spoiler and the surface of the landing flap and, during cruising, with the landing flap pulled in and the spoiler retracted abuts on the surface of the landing flap.

15 Claims, 5 Drawing Sheets

SPOILER FOR WINGS

BACKGROUND OF THE INVENTION

1. Field of the Invention

The invention relates to a spoiler for wings, in particular plane wings, which spoiler is unfoldable during the landing and take-off of the plane or the like and retractable during cruising.

Although, in the following, the use of the spoiler according to the invention is exclusively discussed in connection with the wings of airplanes, its application theoretically is conceivable also with other types of aircraft and other vehicles such as, for instance, high-speed ships or high-speed cars.

The term spoiler serves to denote a deflector provided on the rear upper side of a wing, which, on the one hand, serves as an air brake during landing and, on the other hand, also assists the aileron by asymmetrical use. The English term "spoiler" goes back to the fact that it creates a resistance, thereby annihilating part of the lift.

2. Prior Art

CH 683 982 A5 describes a device for increasing the lift on a plane wing in the form of an air-conducting element, which also may serve as a spoiler after landing.

In order to enable the progressive movement of a plane or the like in the air, a force must act on the same in a sense opposite to the force of gravity. This is obtained through the lift generated by the airfoils or wings of the plane. By appropriately configuring the sections of the wings, the air resistance to the lift is minimized. During the landing of a plane, and in order to reduce the landing run, a reduction of the lift is required. To this end, so-called spoilers or deflectors/air brakes are provided on the surfaces of the wings, which are extended during and after landing thus generating a resistance.

In order to cope with the air traffic, airplanes that become larger and larger are being built for accommodating an increasing number of passengers and loads. Larger and heavier planes have higher landing weights. Hence, a higher landing speed is required for such planes, whereby the landing flaps are placed more steeply than with smaller and lighter planes during landing in order to achieve as high an annihilation of the lift as possible. The particularly steep arrangement of the landing flaps during the landing of the plane causes quite a large gap to be formed between the trailing edge of the spoiler and the surface of the landing flap, which gap brings about undesired aerodynamic effects.

SUMMARY OF THE INVENTION

It is the object of the present invention to provide a spoiler which is suitable for application, in particular, with large and heavy planes and offers enhanced aerodynamic conditions during the landing and take-off of a plane or the like, without adversely affecting the aerodynamic conditions during cruising. This means that the spoiler must not negatively influence the aerodynamic conditions during cruising in a higher speed range, while it is to have as small as possible a distance, or a defined distance, relative to the landing flap in the low speed range during landing. The drawbacks of known constructions are to be avoided or at least reduced. Moreover, the spoiler is to be characterized by as slight a weight as possible.

The object according to the invention is achieved in that a structural member is arranged on the trailing edge of the spoiler, viewed in the direction opposite to the flight direction, which structural member, during landing or taking off, in the unfolded state of the spoiler with the landing flaps extended reduces the gap formed between the trailing edge of the spoiler and the surface of the landing flap and which, during cruising, with the landing flap pulled in and the spoiler retracted abuts on the surface of the landing flap. Due to the extension of the trailing edge of the spoiler according to the invention, the objects of the invention are resolved by the gap formed between the trailing edge of the spoiler and the landing flap during landing or take-off in the low speed range being reduced and the aerodynamic conditions being thereby improved, while the structural member according to the invention in the higher speed range of the plane does not substantially affect the aerodynamic conditions. In addition, the extension of the trailing edge of the spoiler enhances the overlap of the spoiler with the landing flap so as to obtain a "smooth" wing.

According to a further characteristic feature of the invention, the structural member is made of a composite material and, in particular, carbon fiber reinforced plastic. This material stands out for its low weight and high mechanical properties. The use of plastics including glass fibers or aramide fibers or similar fibers may also be envisaged, yet carbon fibers exhibit the best mechanical properties.

If the structural member is composed of several layers of a fabric, a unidirectional material or a combination thereof with defined fiber orientations in each of the layers as a function of the mechanical properties of the structural member, the different spoiler properties according to the present invention will be realized. Thus, on the one hand, the required flexibility by which the structural member clings to the adjacent structural parts during cruising and, on the other hand, the desired rigidity required for preventing the structural member from being bent away during the landing flight will be obtained.

Advantageously, the cross section of the structural member is designed to taper towards the free end. Thereby, the flexibility of the free end is increased and the optimum abutment of the structural member on the wing with the lowest resistance is achieved during cruising and also the oscillating weight on the end of the structural member is reduced.

Advantages will be achieved if the free end of the structural member is designed to be curved in the direction towards the surface of the wing or the landing flap. Such a bias helps to adjust a defined gap between the spoiler and the landing flap aimed for the optimum aerodynamic conditions during the landing and take-off of the plane. Provided the appropriate flexibility of the structural member, the structural member during cruising is pressed at the landing flap against the curvature or bias with a smooth wing.

According to another characteristic feature of the invention, it is provided that the structural member is arranged substantially over the entire length of the trailing edge of the spoiler.

If the structural member is comprised of several parts, it is not necessary to replace the whole structural member in case a structural member part has been damaged.

The flexibility of the free end of the structural member may be enhanced in that the structural member on its free end comprises indents oriented substantially in the flight direction. Such inserts give rise to a substantially comb-like structural member shape optimizing the properties of the structural member.

According to a further characteristic feature, it is provided that the structural member is detachably connected with the spoiler, for instance, by means of rivet or screw connections.

Alternatively, the connection of the structural member with the spoiler may be accomplished by means of a glue connection or the like.

The characteristic features mentioned also apply if the spoiler is made in one piece with the structural member. Due to such an integrated mode of construction, mounting and dismounting of the structural member, or of the parts of the structural member, respectively, on the spoiler are omitted. However, in case of a damage to a part of the spoiler, the latter must be replaced as a whole, if need be.

In order to prevent the spoiler extension according to the invention from colliding with the landing flap, it is provided that the free end of the structural member is designed to be rounded or cambered opposite to the direction towards the surface of the wing or landing flap. As a result, the mechanical friction with the edge of the structural member is reduced during the retraction of the landing flaps, thus ensuring more gentle clinging at the landing flap located therebelow.

BRIEF DESCRIPTION OF THE DRAWINGS

Further characteristic features of the invention and those already mentioned above will be explained in more detail by way of the accompanying drawings, which illustrate an embodiment of the invention. Therein.

DETAILED DESCRIPTION OF PREFERRED EMBODIMENTS OF THE INVENTION

Figure 1:
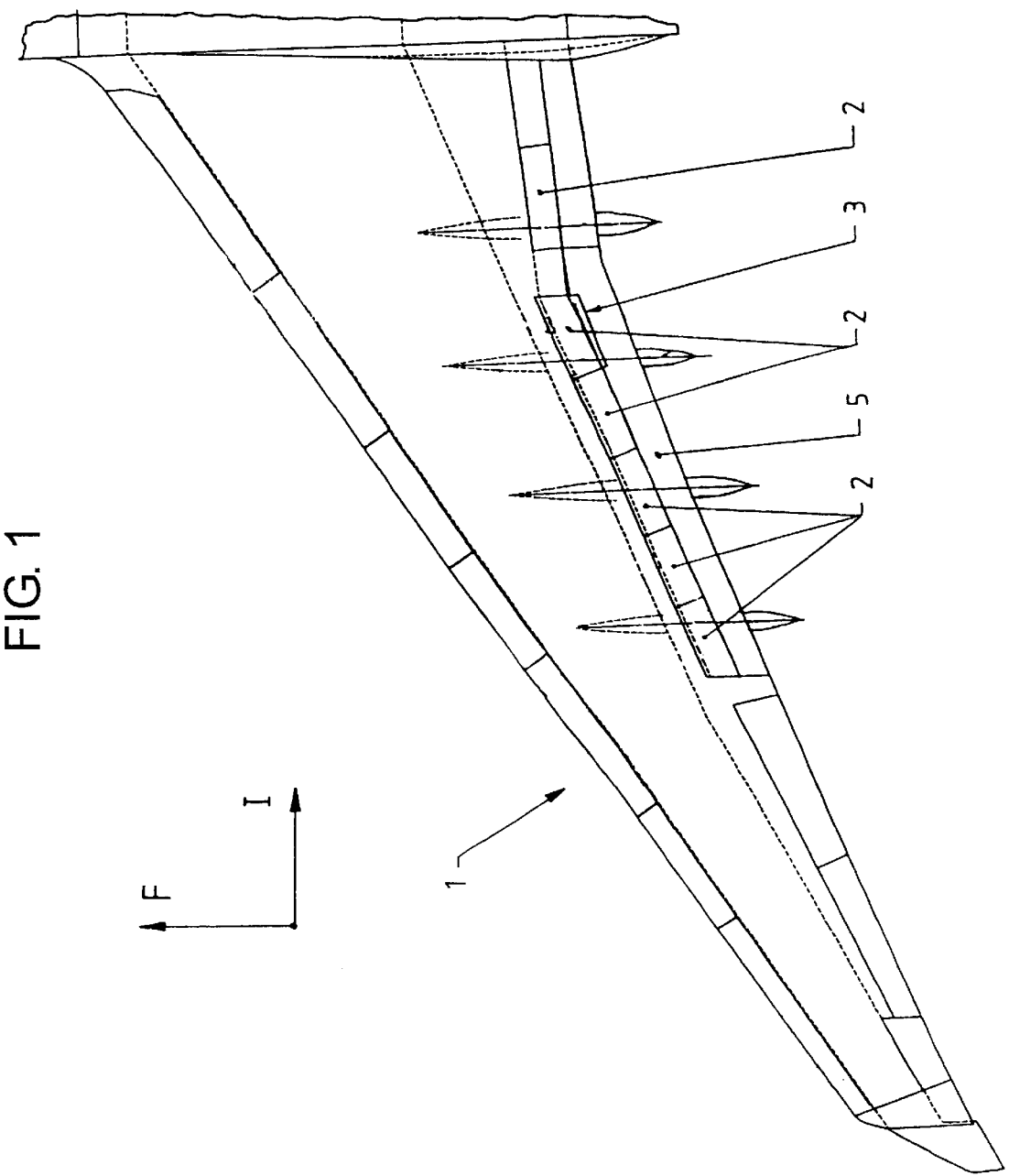
FIG. 1 is a top view on a wing of a plane.

FIG. 1 depicts a wing 1 of a plane in the top view. Arrow F shows the flight direction, while arrow I indicates the direction of the fuselage (not illustrated). Several spoilers 2, in the example illustrated a total of six spoilers 2, are arranged on the rear upper side of the wing in front of the landing flaps 5. The spoilers 2 are unfolded during landing in order to annihilate the lift. As already pointed out above, the spoilers 2, in addition to functioning as air brakes, also serve to assists the aileron in most cases. One of the spoilers 2 is provided with the device according to the invention, which essentially consists of a structural member 3 arranged on the trailing edge 4 of the spoiler 2, viewed in the direction opposite to the flight direction F. In the example illustrated, the second spoiler 2, viewed from the fuselage, is provided with the device according to the invention, since the gap formed between the trailing edge 4 of the spoiler 2 and the landing flap 5 is the largest at that spoiler 2. The structural member 3 may, however, also be provided on other spoilers 2 or on all of the spoilers 2. On the one hand, the structural member 3 must be flexible enough in order not to create any resistance during the higher cruising speed and, on the other hand, it must be stiff enough in order to ensure a defined gap relative to the landing flap 5 so as to obtain an optimum aerodynamic effect. Advantageously, the structural member 3 is made of fiber composites, since in that case the opposing objects will be resolved in a satisfactory manner. Likewise, it is conceivable to produce the structural member 3 itself of a rigid material and connect it with the trailing edge 4 of the spoiler 2 via an elastic connection.

Figure 2:
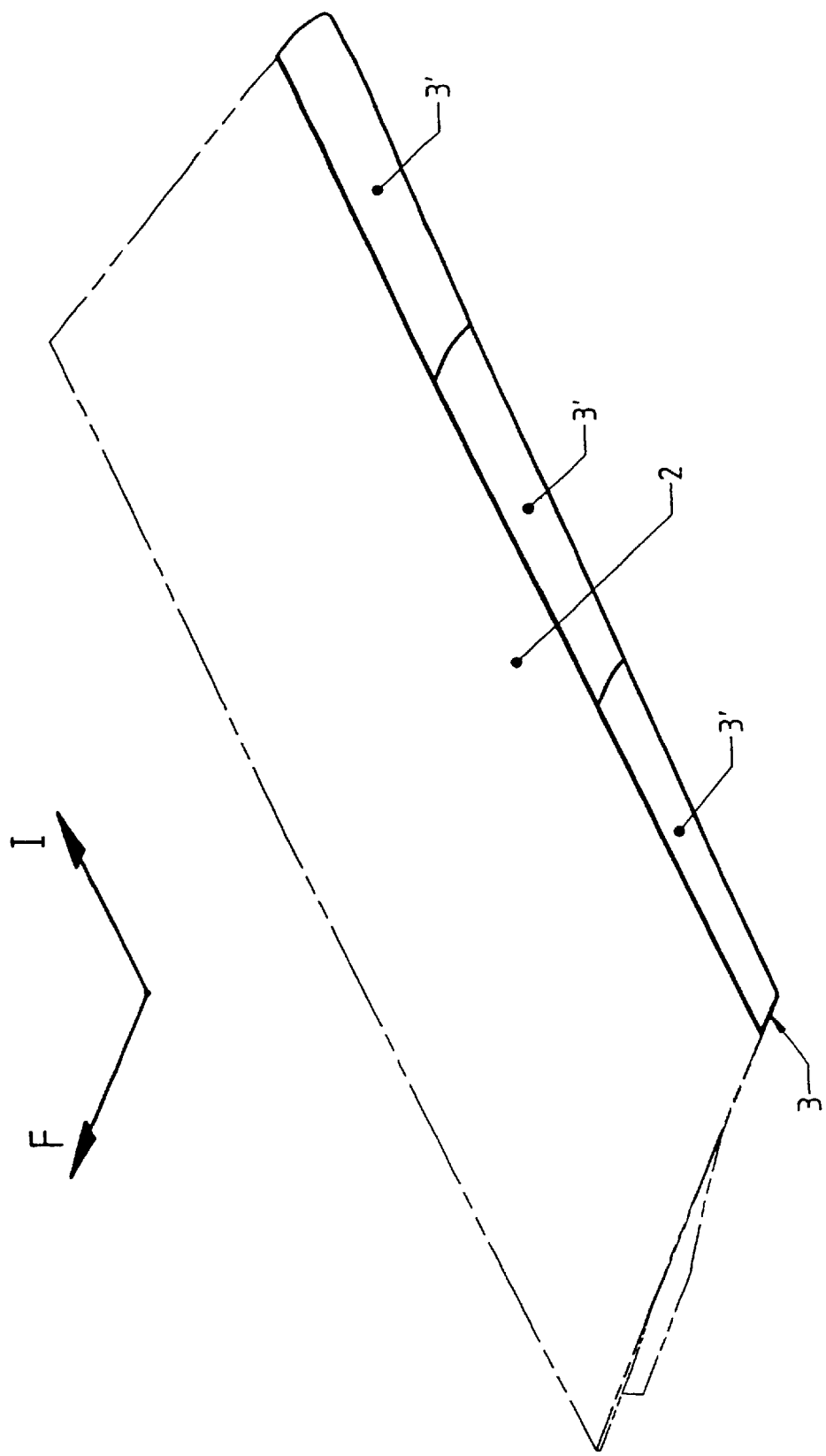
FIG. 2 is a perspective view of a spoiler including the trailing edge extension according to the invention.

FIG. 2 is a perspective view of a spoiler 2 comprising the structural member 3 according to the invention. The spoiler 2, which usually is made of composite materials, has a substantially wedge-shaped form. In the example illustrated, the structural member 3 is composed of three parts 3'. This offers the advantage that no complete replacement is required in case a part 3' has been damaged. Moreover, the flexibility of the structural member 3 is enhanced by the separation of the parts 3'. This may be achieved by indents provided on the free end of the structural member 3 substantially in the flight direction F (not illustrated). Such a comb-shaped structure serves to optimize the properties of the read edge extension of the spoiler 2.

Figure 3:
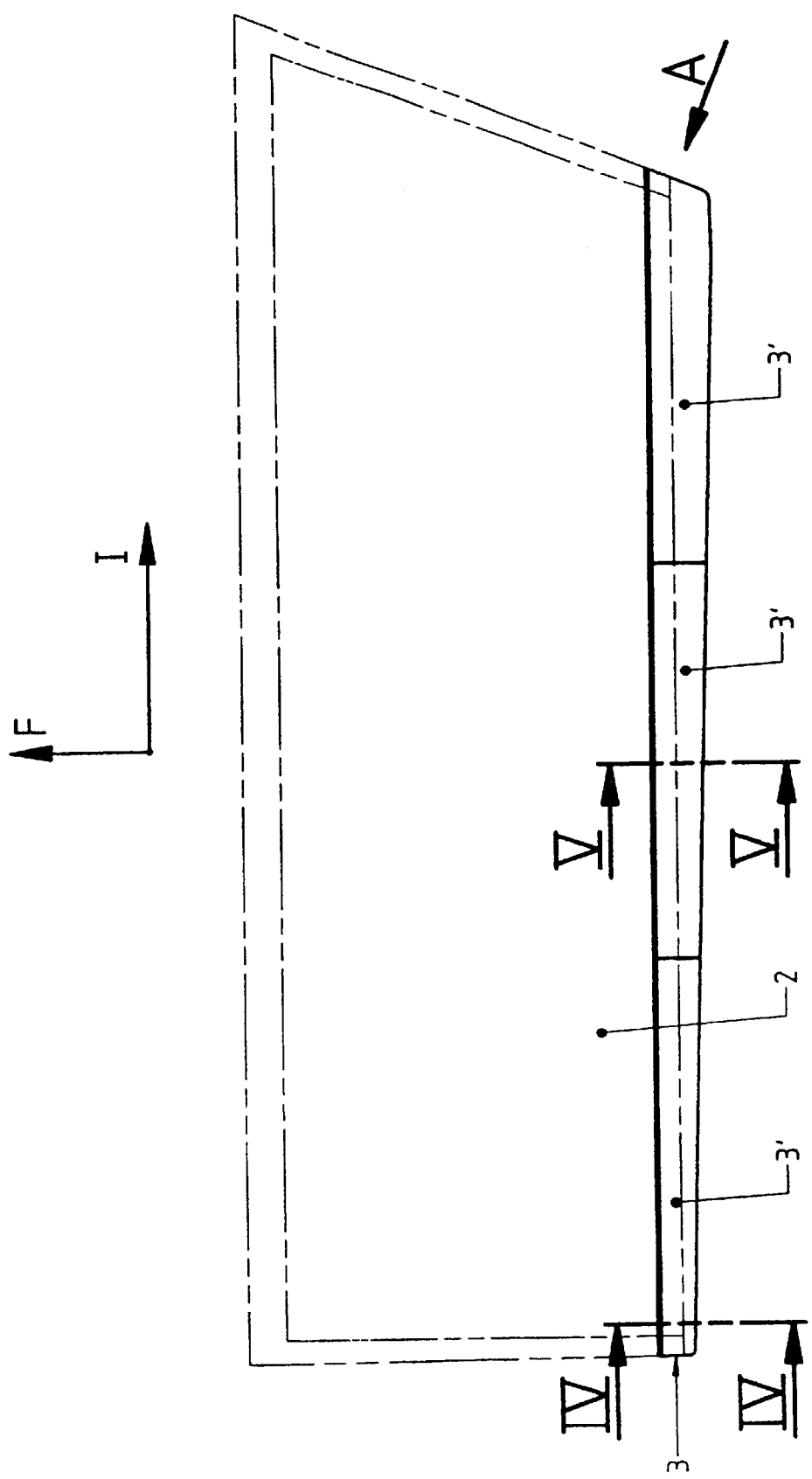
FIG. 3 is a top view on the spoiler according to FIG. 2.

FIG. 3 is a top view on the spoiler 2 according to FIG. 2. In conformity with the shape of the wing 1, the structural member 3 is designed to have no constant width, but widen in the direction towards the fuselage (direction of the arrow I). The structural member 3 is arranged substantially over the entire length of the spoiler 2.

Figure 4:
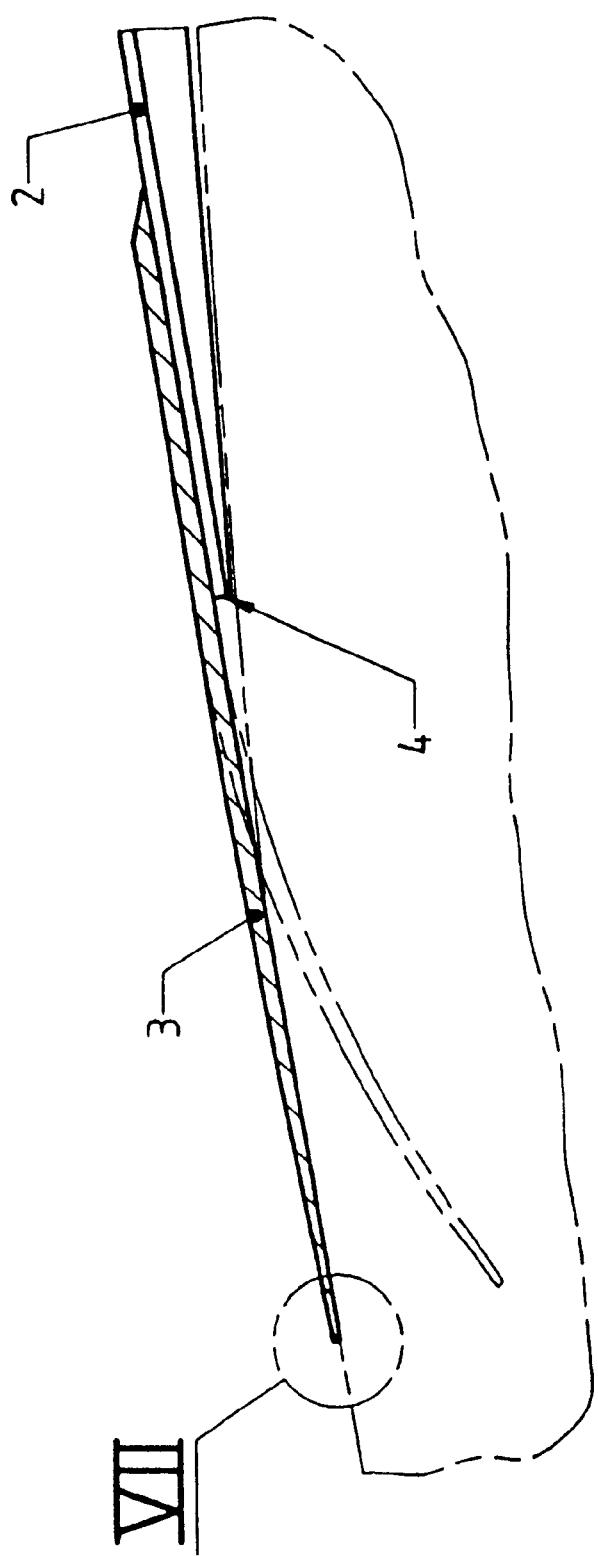
FIG. 4 is a view of the spoiler according to FIG. 3 in the sense of arrow A.

In the side view of the spoiler 2 depicted in FIG. 4 in the direction of the arrow A according to FIG. 3, the structural member 3 is illustrated in the event of cruising (full line) and for the landing flight (broken lines). During cruising the spoiler 2 is retracted and the structural member 3 clings to the surface of the landing flap 5 in a substantially plane manner, thus enhancing the overlap of the spoiler 2 with the landing flap 5. During landing, or during take-off, the spoiler 2 is unfolded and the structural member 3 is curved in the direction of the wing 1 or the landing flap 5 as illustrated. In that case, the rigidity of the structural member 3 has to be chosen such that the latter does not vibrate or flatter during the runway approach or during the take-off maneuver. On the other hand, the structural member 3 must be flexible enough so that it can be pressed at the surface of the landing flap 5 against the curvature with the spoiler 2 retracted.

Figure 5:
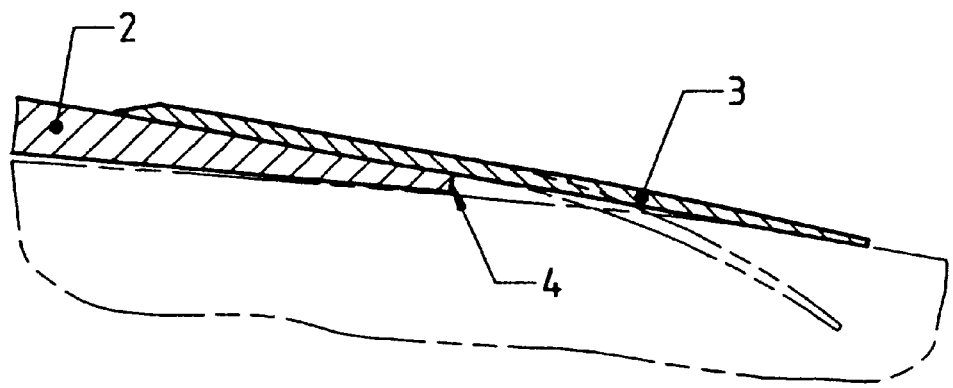
FIG. 5 is a sectional illustration of the spoiler according to FIG. 3 along sectional line V—V.
Figure 6:
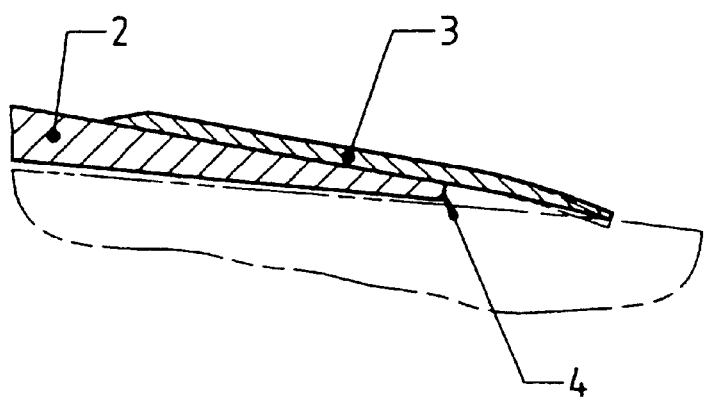
FIG. 6 is a sectional illustration of the spoiler according to FIG. 3 along sectional line VI—VI.

From the sectional illustrations according to FIGS. 5 and 6, the configuration of the structural member 3 with different cross sections is apparent. The configuration tapering towards the free end of the structural member 3, in addition to contributing to a reduction of the oscillating weight on the end of the structural member 3 also contributes to a better abutment on the surface of the landing flap 5 during cruising, resulting in a smooth wing 1.

Figure 7:
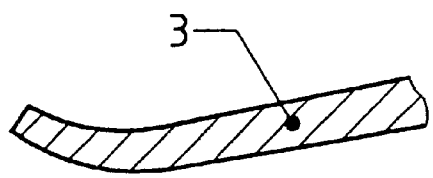
FIG. 7 shows a detail of a particular embodiment of the structural member according to the invention in a sectional illustration.

The detail according to FIG. 7 depicts a particular variant of the configuration of the structural member 3 according to the invention, in which the free end is rounded or cambered opposite to the direction towards the surface of the wing 1, or the landing flap 5. Any undue friction of the structural member 3 on the surface of the landing flap 5 will thereby be prevented after landing as the landing flaps 5 are pulled in. The rounded free end ensures gentle sliding on the surface of the landing flap.

The properties of the structural member 3, or of the rear end of the spoiler 2, in case of a one-piece configuration may be adapted to the respective requirements by varying the cross section and the material properties. In particular, when using composite materials, the object of the invention may be achieved by selectively varying the fiber orientation of each of the layers of the fabric or unidirectional material or combination thereof.

What we claim is:

1. A spoiler arrangement intended to be used with a wing including a landing flap having a landing flap surface, said spoiler arrangement comprising a spoiler capable of being unfolded during landing and take-off of a plane and retracted during cruising of said plane and having a spoiler trailing edge viewed in a direction opposite to a flight direction, and a structural member arranged on said spoiler trailing edge on a side of said spoiler opposite to a side of said spoiler engaging said landing flap surface, said structural member having a free end curved in a direction towards said landing flap, and wherein said spoiler trailing edge and said landing flap surface are in mutual arrangement so as to form a gap between said spoiler trailing edge and said landing flap surface during landing and take-off with said spoiler unfolded and said landing flap extended, and said structural member is constructed to reduce said gap formed between said spoiler trailing edge and said landing flap surface and to abut on said landing flap surface during cruising with said landing flap pulled in and said spoiler retracted.

2. A spoiler arrangement as set forth in claim 1, wherein said structural member is made of a composite material.

3. A spoiler arrangement as set forth in claim 2, wherein said structural member is made of carbon fiber reinforced plastic.

4. A spoiler arrangement as set forth in claim 2, wherein said structural member is comprised of a plurality of layers made of a material selected from the group consisting of a fabric, a unidirectional material and a combination thereof, each of said plurality of layers having a defined fiber orientation as a function of the mechanical properties of said structural member.

5. A spoiler arrangement as set forth in claim 1, wherein said structural member has a cross section tapering towards its free end.

6. A spoiler arrangement as set forth in claim 1, wherein said structural member is arranged substantially over the entire length of said spoiler trailing edge.

7. A spoiler arrangement as set forth in claim 1, wherein said structural member is comprised of a plurality of structural member parts.

8. A spoiler arrangement as set forth in claim 1, wherein said structural member and said spoiler are detachably connected with each other.

9. A spoiler arrangement as set forth in claim 8, further comprising rivet connection means provided to detachably connect said structural member and said spoiler.

10. A spoiler arrangement as set forth in claim 8, further comprising screw connection means provided to detachably connect said structural member and said spoiler.

11. A spoiler arrangement as set forth in claim 1, further comprising glue connection means provided to connect said structural member and said spoiler.

12. A spoiler arrangement as set forth in claim 1, wherein said structural member and said spoiler are produced in one piece.

13. A spoiler arrangement as set forth in claim 1, wherein said structural member has a free end and said free end is rounded.

14. A spoiler arrangement intended to be used with a wing including a landing flap having a landing flap surface, said spoiler arrangement comprising a spoiler capable of being unfolded during landing and take-off of a plane and retracted during cruising of said plane and having a spoiler trailing edge viewed in a direction opposite to a flight direction, and a structural member arranged on said spoiler trailing edge, said structural member having a free end comprising indents oriented substantially in the flight direction, and wherein said spoiler trailing edge and said landing flap surface are in mutual arrangement so as to form a gap between said spoiler trailing edge and said landing flap surface during landing and take-off with said spoiler unfolded and said landing flap extended, and said structural member is constructed to reduce said gap formed between said spoiler trailing edge and said landing flap surface and to abut on said landing flap surface during cruising with said landing flap pulled in and said spoiler retracted.

15. A spoiler arrangement intended to be used with a wing including a landing flap having a landing flap surface, said spoiler arrangement comprising a spoiler capable of being unfolded during landing and take-off of a plane and retracted during cruising of said plane and having a spoiler trailing edge viewed in a direction opposite to a flight direction, and a structural member arranged on said spoiler trailing edge, said structural arrangement having a free end, said free end being cambered opposite to the direction towards said landing flap surface, and wherein said spoiler trailing edge and said landing flap surface are in mutual arrangement so as to form a gap between said spoiler trailing edge and said landing flap surface during landing and take-off with said spoiler unfolded and said landing flap extended, and said structural member is constructed to reduce said gap formed between said spoiler trailing edge and said landing flap surface and to abut on said landing flap surface during cruising with said landing flap pulled in and said spoiler retracted.

* * * * *